3,012,384
REMOVAL OF SURFACE IMPERFECTIONS
FROM BENT GLASS SHEETS
Wilbur F. Brown, Toledo, Paul L. Sellers, Waterville, and Joseph J. Jarosi, Toledo, Ohio, assignors to Libbey-Owens-Ford Glass Company, Toledo, Ohio, a corporation of Ohio
Filed Aug. 27, 1958, Ser. No. 757,497
4 Claims. (Cl. 51—283)

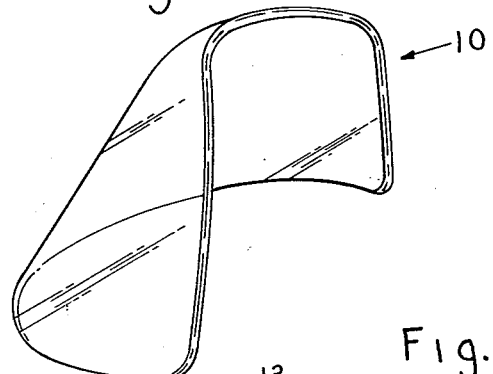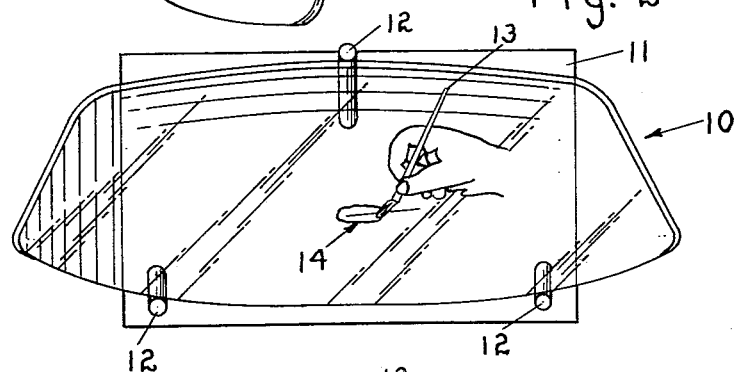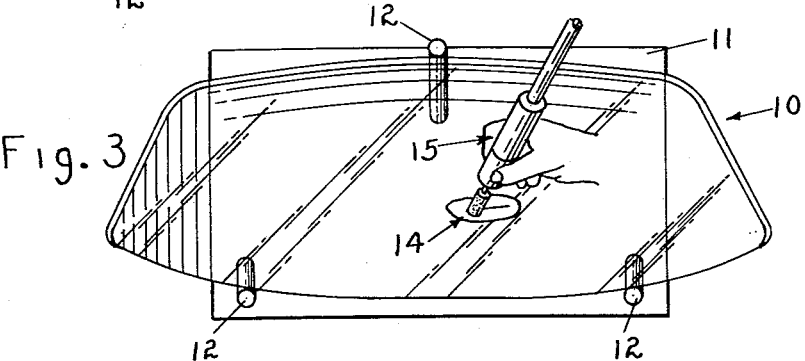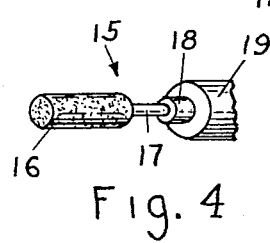

The present invention relates broadly to the treatment of bent glass sheets and more particularly to a method of removing localized surface imperfections or defects therefrom.

In the manufacture of windshields and backlights for present-day automobiles a feature of major importance in these glazing units is that they provide the maximum possible transmission of light with a minimum of distortion and defects which would disturb vision therethrough. In order to provide and maintain this high standard in manufacturing, any surface irregularities or scratches must be removed leaving the viewing area in that region substantially free from these irregularities and capable of passing stringent optical tests as required by automobile safety regulations. This is particularly true in regard to the windshields which, because of their nature and use in the automobile, have to be of exceptionally fine quality.

Heretofore, the removal of these scratches and imperfections was accomplished by physically lifting the light and holding the affected portions in contact with a relatively large slowly rotating polishing wheel on which a slurry of an abrasive was applied. However, with the advent of the larger viewing areas in the lights of modern day cars, especially the more recent windshields and backlights of the panoramic or hook types having complex multi-axial curves, the imperfection eradication by customary methods has become an infeasible process from a commercial standpoint because of the large labor costs involved in the handling of these lights. For example, some of the larger and more severely curved species of windshields and backlights have required the combined efforts of two workmen in order to effectively remove scratches or other imperfections by the former methods.

Now, however, it is possible by the practice of the method of the present invention to remove localized imperfections from the surface of relatively large sharply and complexly curved lights with a minimum of handling and in a relatively short time.

Briefly, the method of the invention comprises mounting the light to be treated in a substantially immovable relationship, applying a suitable abrasive material onto localized surface areas of the light having imperfections and defects thereon, and contacting the abrasive covered areas with a special ultrahighspeed tool having an operating surface only slightly greater than the areas to be treated.

In the drawings wherein like numerals are employed to designate like parts throughout the same:

FIG. 1 is a perspective view of a typical complexly curved light with which the present invention has special utility;

FIG. 2 is a perspective front view of the light of FIG. 1 located in a mounting frame and illustrates one step of the novel method of the invention;

FIG. 3 is a view similar to FIG. 2 and shows a second step of the method; and

FIG. 4 is a perspective fragmentary view of a tool for practicing the invention.

Referring particularly, to FIG. 1, there is illustrated a bent light 10 with which the method of the present invention has been shown to have particular utility. Lights of this character may be either of a single tempered sheet such as used in the backlights of automobiles, or of a laminated structure comprised of a pair of similarly bent glass sheets incorporating a layer of transparent plastic material therebetween and bonded into a composite unit. The most outstanding characteristic of these lights is their complexly curved nature which as mentioned above has made the handling of the large sheet expanses extremely difficult, making the application of conventional scratch removal techniques difficult and, in the case of lights which are bent about a plurality of axes, commercially infeasible.

In an effort to overcome the difficult problem of scratch polishing units of the above character, polishing tools of a smaller size were used. It was found, however, that a mere reduction in the size of the polishing tool, although permitting the obvious advantage of being able to work in the sharply curved portions of such lights still did not provide a desirable scratch polishing operation. It was found that when a polishing tool of relatively small dimensions and rotated at a very high velocity is used in combination with an abrasive slurry, a considerable increase in the efficiency of removing imperfections, such as scratches, from a glass surface was obtained.

Although the exact reasons are not known, the increased ease of removal of imperfections achieved by the method of the invention exceed results that would be expected from a mere increase in the rotating speed of the tool alone, or from the summation of all of anticipated effects of the different steps of the invention.

Turning now to the details of the invention, FIG. 2 illustrates a curved light 10 located in a substantially upright relation on a rack or frame 11, having a plurality of resilient mounting studs 12 for securing the light in a substantially immovable position.

The frame 11 extends longitudinally in regard to the light 10 a distance which is substantially the same as the central and less sharply curved portions of the sheet 10. Therefore, when in mounting position, the sheet 10 may be placed with either the convex side or the concave side toward the frame, and the curved end portions of the light will not be obstructed by the frame.

The first step of the process as shown in FIG. 2 is the application by means of a brush 13 of a slurry of a suitable abrasive, such as cerium oxide, to the affected portion of the glass surface 14. Although a number of different surfacing compounds may be found to be useful, and a number of different concentrations of cerium oxide itself may be found satisfactory, excellent results were obtained with a cerium oxide slurry consisting of two parts cerium oxide to one part water.

After the surfacing compound has been applied to the area 14, and before the slurry has dried, a surfacing tool 15 rotating at an extremely high speed is brought into contact with the areas and moved across the area several times. During this eradication step it is neither desirable nor necessary to apply more than a slight pressure onto the glass surface.

In FIG. 4 the surfacing tool 15 for accomplishing the novel smoothing is shown as comprising a hard felt cylinder 16 axially mounted on a spindle 17 which is received in a chuck 18 supplied with rotating power by a suitable drive means 19.

A preferred form of cylinder 16 with which excellent results were obtained was purchased from the Western Felt Works of Chicago, Illinois, and designated as a No. 201 felt. This cylinder was approximately $5/16$ of an inch long and $5/8$ of an inch in diameter. Although not completely understood, it was found that the cross-sectional dimensions of the rotating tool had a particular criticality for optimum operation. Thus, with the speeds set forth hereinbelow, it was found that if the felt cylinder exceeded 1 inch in diameter difficulty was encountered in locating the tool properly in regard to the scratched area and in contacting the affected glass area with the rotating circular face. Also, if the tool were less than a quarter of an inch in diameter the surfacing property of the tool was found to drop off rapidly and the removal operation efficiency reduced accordingly.

The driving means 19 used was a Kellerflex vane-type air turbine manufactured by the Pratt-Whitney Company of West Hartford, Connecticut. This driving means was capable of turning the tool at approximately 25,000 r.p.m. However, because of normal variations in the hydraulic pressure supplied to the drive means, the operational speed was found to vary from 20,000 to 30,000 r.p.m. It was found, however, that satisfactory results, although not as good as those obtained with the rotative speeds above 20,000 r.p.m., are obtained with speeds as low as 10,000 r.p.m., however, below 10,000 r.p.m. the efficiency dropped off rapidly. Also, at speeds exceeding 30,000 r.p.m. there was a marked tendency to burn the glass area before the imperfections were removed unless exceptional care was exercised by the operator.

As brought out briefly above, the operation of the invention is not believed to be merely the result of a single step in the method but rather it is the combination result of using a special hard felt cylindrical tool having a cross sectional diameter measurement of between ¼ of an inch and 1 inch which is rotated at a speed between 10,000 and 30,000 r.p.m.

As a result of the invention, relatively large complexly curved sheets of glass can have surface scratches removed in a matter of seconds by a single workman whereas heretofore it frequently required two workmen a matter of minutes to accomplish the same thing. It is, of course, readily appreciated that in the manufacture of a relative high volume product, such as automobile windshields and backlights, that the total savings possible are considerable.

It is to be understood that the form of the invention herewith shown and described is to be taken as a preferred embodiment of the same, but that various changes in shape, size and arrangement of parts may be resorted to without departing from the spirit of the invention or the scope of the subjoined claims.

We claim:

1. A method of removing a surface defect from a localized area of a relatively large sheet of polished glass without objectionably altering the optical properties of said sheet which comprises applying a polishing agent to said surface defect and rubbing said polishing agent over said localized area at a frequency of at least 10,000 times per minute.

2. A method as defined in claim 1 in which said polishing agent is rubbed over said localized area with a circular motion at a velocity of at least 10,000 r.p.m.

3. A method as defined in claim 1 in which said polishing agent is rubbed over said localized area with a rotary motion at a velocity of at least 10,000 r.p.m. under a tool having a maximum dimension in contact with the glass surface between one-quarter inch and one inch.

4. A method as defined in claim 1 in which said polishing agent is rubbed over said localized area with a rotary motion at a velocity between 10,000 and 30,000 r.p.m. under a tool having the consistency of hard felt and a maximum dimension in contact with the glass surface between the one-quarter inch and one inch.

References Cited in the file of this patent

UNITED STATES PATENTS

| | | |
|---|---|---|
| 2,315,885 | Waldron | Apr. 6, 1943 |
| 2,450,433 | Leeman | Oct. 5, 1948 |
| 2,597,182 | Rickner | May 20, 1952 |
| 2,910,813 | De Vore | Nov. 3, 1959 |